United States Patent [19]

Gagin

[11] 4,177,077

[45] Dec. 4, 1979

[54] GLASS COMPOSITION FOR FIBERIZATION

[75] Inventor: Lawrence V. Gagin, Littleton, Colo.

[73] Assignee: Johns-Manville Corporation, Denver, Colo.

[21] Appl. No.: 943,837

[22] Filed: Sep. 19, 1978

Related U.S. Application Data

[63] Continuation-in-part of Ser. No. 847,621, Oct. 31, 1977, abandoned.

[51] Int. Cl.$^2$ .......................... C03C 13/00; C03C 3/08
[52] U.S. Cl. ......................................... 106/50; 106/54
[58] Field of Search ..................................... 106/50, 54

[56] References Cited

U.S. PATENT DOCUMENTS

| | | | |
|---|---|---|---|
| 2,877,124 | 3/1959 | Welsch | 106/50 |
| 3,013,888 | 12/1961 | de Lajarte | 106/50 |
| 3,085,887 | 4/1963 | Labino et al. | 106/50 |
| 3,508,939 | 4/1970 | Laurent et al. | 106/50 |
| 3,513,002 | 5/1970 | Labino | 106/50 |
| 3,817,764 | 6/1974 | Wolf | 106/50 |

FOREIGN PATENT DOCUMENTS 611057   12/1960   Canada ......................................... 106/54

*Primary Examiner*—Helen M. McCarthy
*Attorney, Agent, or Firm*—Robert M. Krone; Joseph J. Kelly; William C. Anderson

[57] ABSTRACT

A glass composition having improved working properties and of particular utility for fiberization by the rotary or centrifugal process that does not employ conventional hot gas blast attenuation, into fibers exhibiting improved chemical durability, consisting essentially of: $SiO_2$; CaO; $B_2O_3$; $Na_2O$; $Al_2O_3$; and ZnO; and small amounts of $Fe_2O_3$, $TiO_2$, $K_2O$, MgO and $SO_3$.

9 Claims, No Drawings

GLASS COMPOSITION FOR FIBERIZATION

CROSS-REFERENCE TO RELATED APPLICATION

This application is a continuation-in-part of co-pending application Ser. No. 847,621, now abandoned, which was filed Oct. 31, 1977, entitled "Glass Composition for Fiberization."

BACKGROUND OF THE INVENTION

A common present day method of glass fiber production is the rotary or centrifugal process by which molten glass from a furnace is fed into a rotating refractory metal spinner having a large number of holes in its periphery and maintained at a relatively high temperature. Steam jets, air jets or gas burners are arranged around the spinner to provide downwardly directed gaseous streams of annular section. The spinner rotates at a relatively high speed and under the influence of centrifugal force the molten material is directed radially outwardly through the spinner holes and delivered into the peripheral gaseous blast which attenuates the material into fine diameter fibers.

A recent advancement in the rotary fiberization field provides for the manufacture of glass fibers having an average diameter below 7 microns without the necessity of using a relatively high temperature gaseous blast to attenuate the primary fibers. It was discovered that staple fibers having the desired diameter could be produced solely by passing molten material through the orifices of a rotor into a plurality of relatively cold and relatively low pressure gas flows, thus eliminating the hot gas blast used in the prior art and the fuel usage associated therewith.

Satisfactory production of fibers by the method described in the preceding paragraph requires that the glass compositions have certain defined characteristics. One of the primary requirements is that the glass have a relatively low melting and working temperature, so that it may be readily worked on a continuous and rapid basis with a minimum of energy required for melting it. The low working temperature is also needed to minimize corrosion and wear of the metal spinner. The glass must also have a Liquidus temperature that is sufficiently lower than the relatively low working temperature, thus enabling low temperature rotary fiberization by the above described method without devitrification, i.e., the undesirable formation of crystals. Additionally, the glass must have a viscosity at these relatively low working temperatures that is sufficiently low to permit high levels of fiber production. A final requirement is chemical durability. It is essential to use a glass composition that provides a fiber of extremely high weather resistance since the great amount of surface exposed per unit of weight renders the fibers sensitive to the corrosive influence of even such moisture as is present in the air.

Glass compositions heretofore used which meet the requirements of softening point, viscosity, Liquidus and durability, have also been characterized by relatively high working temperatures.

SUMMARY OF THE INVENTION

The present invention involves glass compositions which are useful for the production of glass fibers by a rotary or centrifugal process which does not use the conventional external hot gas attenuating technique. The glass compositions and glass fibers made from them fall within the following broad range of proportions:

| Ingredient | Parts by Weight |
|---|---|
| $SiO_2$ | 54–57 |
| $Al_2O_3$ | 3–4 |
| CaO | 10–13 |
| $Na_2O$ | 16–19 |
| $B_2O_3$ | 9–12 |
| ZnO | 1–3.5 |

Other ingredients which enter the composition either as impurities, because of economic reasons or as melting aids include the following:

| | |
|---|---|
| $Fe_2O_3$ | 0–0.13 |
| $K_2O$ | 0–2.7 |
| MgO | 0–0.6 |
| $SO_3$ | 0–0.3 |

Glass compositions falling within this range of proportions have softening points of 1207° F. to 1221° F., Liquidus points of 1700° F. to 1740° F., and temperatures at a viscosity of 1000 poises of 1690° F. to 1730° F. The durability of the glass compositions in the form of fine diameter fibers to chemical attack by water is determined by submerging 5 micron monofilament samples in pure water for one hour at 100° C. Weight loss ranges between 2.1% and 3.0%.

The invention has as one of its objects the provision of glass compositions that are amenable to fiberization by the rotary process at low operating temperatures.

Yet another object of the invention lies in the provision of glass compositions having a low Liquidus temperature as well as good resistance to crystal formation.

Still another object of the invention is the provision of new glass compositions which, in the form of fine fibers, is highly resistant to chemical attack by moisture.

It is a further object of the invention to provide glass compositions having the fluidity characteristics whereby good spinner production rates may be realized at relatively low operating temperatures.

It is a still further object of this invention to minimize the rate of wear and corrosion of the metal rotor used in the fiberization process.

These and other objects and advantages, especially high moisture resistance and improved working properties, particularly low viscosity at low temperatures are directly attributable to the concerted effects of the cooperation or interaction of a relatively narrow range of essential constituent oxide ingredients providing the new glass compositions of this invention.

DESCRIPTION OF THE INVENTION

In arriving at the invention several glass compositions were tested. The following Table gives a parts by weight analysis of some of these glasses including six examples of compositions according to the invention. Working characteristics and chemical properties of seven compositions are shown.

TABLE I

| | 1 | 2 | 3 | 4 | 5 | 6 | 7 | D |
|---|---|---|---|---|---|---|---|---|
| $SiO_2$ | 55.0 | 55.2 | 55.4 | 55.2 | 54.5 | 55.3 | 57.0 | ±.4 |
| $Al_2O_3$ | 3.6 | 3.6 | 3.2 | 3.6 | 3.8 | 3.3 | 3.6 | ±.3 |
| CaO | 11.5 | 11.8 | 14.7 | 11.7 | 11.0 | 10.8 | 10.1 | ±.4 |
| $Na_2O$ | 17.8 | 16.5 | 16.5 | 17.0 | 16.3 | 17.1 | 17.2 | ±.3 |

TABLE I-continued

| | 1 | 2 | 3 | 4 | 5 | 6 | 7 | D |
|---|---|---|---|---|---|---|---|---|
| $B_2O_3$ | 9.8 | 9.7 | 8.7 | 9.7 | 10.0 | 11.1 | 9.2 | ±.3 |
| ZnO | 1.5 | 1.4 | — | 1.4 | 1.5 | 1.3 | 1.5 | ±.2 |
| $Fe_2O_3$ | 0.13 | 0.05 | 0.08 | 0.08 | 0.05 | 0.06 | 0.08 | ±.2 |
| $K_2O$ | 0.4 | 1.2 | 0.7 | 0.7 | 2.7 | 0.7 | 0.7 | ±.2 |
| MgO | 0.2 | 0.3 | 0.6 | 0.4 | 0.2 | 0.3 | 0.3 | ±.2 |
| $SO_3$ | 0.1 | 0.2 | 0.1 | 0.2 | 0.1 | 0.1 | 0.3 | ±.05 |
| Softening Point | 1215 | 1221 | 1215 | 1215 | 1215 | 1207 | 1221 | |
| Liquidus °F. | 1740 | 1740 | 1845 | 1720 | 1720 | 1710 | 1700 | |
| % Weight Loss Water Test | n.m.* | 2.1 | 4.4 | 2.3 | n.m.* | 3.0 | 2.3 | |
| Vol. of Neutralizing 0.02N $H_2SO_4$ in ml per $100^2 ml^4$ Test Water | n.m.* | 4.2 | 9.9 | 4.4 | n.m.* | 5.4 | 4.1 | |
| Viscosity °F. at 1000 poises (estimated) | 1690 | 1730 | 1715 | 1730 | 1710 | 1710 | 1700 | |

*not measured

All of these glasses except Example 3 fiberize satisfactorily in a rotary operation. Example 3 has a higher Liquidus and lower viscosity, and formation of crystals in the metal rotor due to the high Liquidus may prevent production of good quality fiber. The other examples exhibit excellent working characteristics; i.e., low Softening Point, Liquidus and Viscosity, as well as excellent moisture resistance as indicated by the low weight loss and low alkali release in water.

The column headed "D" in Table I above shows the normal deviation in the percentage of each component which may be present while yet obtaining glass compositions equivalent to those listed. Thus, for instance, with Glass No. 1, one could vary the silican content of 55.0% by ±0.4% (i.e., from 54.6% to 55.4%) without imparting any significant change to the glass properties. The contents of the other components would of course be varied slightly, within their acceptable limits listed in column "D," to compensate for the variation in silica. All glasses falling within the listed component deviations for a particular glass listed in Table I should, therefore, for the purposes of this invention be considered to be identical to the listed glass.

The glass compositions of this invention and the glass fibers made from them have a preferred range of major ingredients as follows:

| Ingredient | Parts by Weight |
|---|---|
| $SiO_2$ | 54.5–57.0 |
| $Al_2O_3$ | 3.3– 3.8 |
| CaO | 10.1–12.2 |
| $Na_2O$ | 16.2–18.1 |
| $B_2O_3$ | 9.2–11.1 |
| ZnO | 1.2– 1.7 |

Specific glass compositions constituting the preferred embodiments of this invention are described in Examples 1, 2, 4, 5, 6 and 7 of Table I. These compositions provide a glass that is very fluid at the usual working temperatures for rotary fiber forming, and can be used at temperatures substantially lower than temperatures generally used in rotary fiber forming, thus causing less wear and corrosion of the metal spinners used in the rotary process. The low Liquidus temperature of these glasses permits the working of the molten material at relatively low temperatures by eliminating the danger of devitrification or formation of crystals during fiber formation. Moreover, as shown in Table I, it has been found that these glasses have very good resistance and durability to moisture attack when in the form of fine fibers.

Silica ($SiO_2$) is the basic glass forming ingredient. Lesser amounts of silica tend to give poor fiberizing. Greater quantities increase viscosity, necessitating higher temperatures for fiberizing.

Alumina ($Al_2O_3$) adds to durability and retards devitrification but it also increases viscosity, so excessive amounts must be avoided lest the glass melt become too viscous for fiberization.

Calcia (CaO) provides durability against water attack and helps keep the glasses fluid in the working temperature range of about 1700° F. to 1800° F.

Soda ($Na_2O$) is the most active fluxing agent and is used in these glass compositions to maintain the desired viscosity requirements. Ordinarily its proportions must be limited because it is the oxide chiefly responsible for attack by water on glasses, however, the glass composition according to this invention is unique in having appreciable proportions of soda yet demonstrating an excellent durability to attack by water.

Boric Oxide ($B_2O_3$) acts as a flux and is also necessary for maintaining chemical durability.

Zinc Oxide (ZnO) is a major ingredient which when used up to about 3.5 parts by weight contributes substantially to durability against chemical attack by water, having a greater effect on durability than does an equivalent weight of CaO or MgO. Were ZnO unavailable, then $TiO_2$ or $ZrO_2$ of about 2 parts by weight, may be used to improve chemical durability.

$Fe_2O_3$, $TiO_2$ and $K_2O$ enter these glass compositions in small amounts as impurities in the batch materials commonly used for economic reasons.

Magnesia (MgO) is an ingredient which contributes to the properties of the compositions much the same way as does calcia. It enters as an impurity included in economic batch materials.

The $SO_3$ results from use of sulfates to aid melting, or from impurities.

Use of generally available, economic batch materials could introduce small amounts of other oxides, such as BaO and SrO, without departing from the scope of the invention.

Modifications and variations within the scope of the attached claims are intended to be included.

What is claimed is:

1. A glass composition of improved moisture resistance in the form of fibers consisting essentially of by weight:

| | Parts |
|---|---|
| $SiO_2$ | 54–57 |
| $Al_2O_3$ | 3–4 |
| CaO | 10–13 |
| $Na_2O$ | 16–19 |
| $B_2O_3$ | 9–12 |
| ZnO | 1–3.5 | and having a softening temperature of about 1207° F. to 1221° F., a Liquidus temperature of about 1700° F. to 1740° F., and a temperature at a viscosity of 1000 poises of 1690° F. to 1730° F.

2. A glass composition according to claim 1 consisting essentially of by weight:

|  | Parts |
| --- | --- |
| $SiO_2$ | 54.5–57.0 |
| $Al_2O_3$ | 3.3–3.8 |
| CaO | 10.1–12.2 |
| $Na_2O$ | 16.2–18.1 |
| $B_2O_3$ | 9.2–11.1 |
| ZnO | 1.2–1.7 |

3. A glass composition of improved moisture resistance in the form of fibers consisting essentially of by weight:

|  | Parts |
| --- | --- |
| $SiO_2$ | 54.5–55.6 |
| $Al_2O_3$ | 3.4–3.8 |
| CaO | 11.0–12.2 |
| $Na_2O$ | 16.2–18.1 |
| $B_2O_3$ | 9.4–10.0 |
| ZnO | 1.2–1.7 | and having a softening temperature of about 1209° F. to 1221° F., a liquidus temperature of about 1700° F. to 1740° F., and a temperature at a viscosity of 1000 poises of 1690° F. to 1730° F.

4. A glass composition of improved moisture resistance in the form of fibers consisting essentially of by weight:

|  | Parts |
| --- | --- |
| $SiO_2$ | 54.8–55.6 |
| $Al_2O_3$ | 3.4–3.8 |
| CaO | 11.3–12.1 |
| $Na_2O$ | 16.7–17.3 |
| $B_2O_3$ | 9.4–10.0 |
| ZnO | 1.2–1.6 | and having a softening temperature of about 1209° F. to 1221° F., a Liquidus temperature of about 1700° F. to 1740° F., and a temperature at a viscosity of 1000 poises of 1690° F. to 1730° F.

5. A glass composition according to claim 1 consisting essentially of by weight:

|  | Parts |
| --- | --- |
| $SiO_2$ | 55.3–57.0 |
| $Al_2O_3$ | 3.6–3.8 |
| CaO | 10.1–10.8 |
| $Na_2O$ | 17.1–17.2 |
| $B_2O_3$ | 9.2–11.1 |
| ZnO | 1.3–1.5 | and having a softening temperature of about 1207° F. to 1221° F., a Liquidus temperature of about 1700° F. to 1710° F., and a temperature at a viscosity of 1000 poises of 1700° F. to 1710° F.

6. A glass composition according to claim 4 comprising by weight:

|  | Parts |
| --- | --- |
| $SiO_2$ | 55.2 |
| $Al_2O_3$ | 3.6 |
| CaO | 11.7 |
| $Na_2O$ | 17.0 |
| $B_2O_3$ | 9.7 |
| ZnO | 1.4 |
| $Fe_2O_3$ | 0.08 |
| $K_2O$ | 0.7 |
| MgO | 0.4 |
| $SO_3$ | 0.2 | and having a temperature at 1000 poises of 1730° F.

7. A glass composition according to claim 3 comprising by weight:

|  | Parts |
| --- | --- |
| $SiO_2$ | 55.2 |
| $Al_2O_3$ | 3.6 |
| CaO | 11.8 |
| $Na_2O$ | 16.5 |
| $B_2O_3$ | 9.7 |
| ZnO | 1.4 |
| $Fe_2O_3$ | 0.05 |
| $K_2O$ | 1.2 |
| MgO | 0.3 |
| $SO_3$ | 0.2 | and having a temperature at 1000 poises of 1730° F.

8. A glass composition according to claim 3 comprising by weight:

|  | Parts |
| --- | --- |
| $SiO_2$ | 55.0 |
| $Al_2O_3$ | 3.6 |
| CaO | 11.5 |
| $Na_2O$ | 17.8 |
| $B_2O_3$ | 9.8 |
| ZnO | 1.5 |
| $Fe_2O_3$ | 0.13 |
| $K_2O$ | 0.4 |
| MgO | 0.2 |
| $SO_3$ | 0.1 | and having a temperature at 1000 poises of about 1710° F.

9. A glass composition according to claim 3 comprising by weight:

|  | Parts |
| --- | --- |
| $SiO_2$ | 54.5 |
| $Al_2O_3$ | 3.8 |
| CaO | 11.0 |
| $Na_2O$ | 16.3 |
| $B_2O_3$ | 10.0 |
| ZnO | 1.5 |
| $Fe_2O_3$ | 0.05 |
| $K_2O$ | 2.7 |
| MgO | 0.2 |
| $SO_3$ | 0.1 | and having a temperature at 1000 poises of 1710° F.

* * * * *